(12) United States Patent
Bezryadin

(10) Patent No.: US 7,916,938 B2
(45) Date of Patent: Mar. 29, 2011

(54) COMPUTER-IMPLEMENTED GAMUT MAPPING

(75) Inventor: Sergey N. Bezryadin, San Francisco, CA (US)

(73) Assignee: KWE International, Inc., South San Francisco, CA (US)

( * ) Notice: Subject to any disclaimer, the term of this patent is extended or adjusted under 35 U.S.C. 154(b) by 909 days.

(21) Appl. No.: 11/832,595

(22) Filed: Aug. 1, 2007

(65) Prior Publication Data

US 2009/0033677 A1 Feb. 5, 2009

(51) Int. Cl.
*G06K 9/00* (2006.01)
(52) U.S. Cl. ........................................................ 382/162
(58) Field of Classification Search .................. 382/162, 382/166–167; 358/1.9, 515, 518–520; 345/590–591, 600, 603–604
See application file for complete search history.

(56) References Cited

U.S. PATENT DOCUMENTS

| | | | |
|---|---|---|---|
| 6,560,356 B1 | 5/2003 | Takahashi et al. | |
| 6,762,792 B1 | 7/2004 | Matsumura | |
| 7,573,610 B2 * | 8/2009 | Um et al. | 358/1.9 |
| 2003/0117457 A1 | 6/2003 | Qiao | |
| 2004/0143380 A1 | 7/2004 | Stam et al. | |
| 2007/0146831 A1 | 6/2007 | Bezryadin | |

FOREIGN PATENT DOCUMENTS

WO 2005/043887 5/2005

OTHER PUBLICATIONS

Koren, Norman; "Color Management and Color Science"; Copyright 2002-2004, http://www.normankoren.com/color_management.html; 11 pages.
Walker, John; "Colour Rendering of Spectra", http://www.fourmilab.ch/documents/specrend/ Apr. 25, 1996; 7 pages.
"CIE 1976 L*a*b* color model", http://www.labcognition.com/panoramaonlinehelp/englisch/colorimetric_analysis/color, Copyright 2004-2007 LabCognition, analytical Software GmbH & Co. KG; 2 pages.
Young, Andrew T., "Rendering Spectra", http://mintaka.sdsu.edu/GF/explain/optics/rendering/html., Copyright 2002-2006; 8 pages.
Yang, Chistopher C., and Kwok, S.H., "Efficient Gamut Clipping for Color Image Processing Using LHS and YIQ", 2003 Society of photo-optical instrumentation engineers; pp. 701-711.
Walker, John; "Color Rendering of Spectra", http://www.fourmilab.ch/documents/specrend/specrend.c Mar. 9, 2003; 5 pages.

* cited by examiner

*Primary Examiner* — Jose L Couso
(74) *Attorney, Agent, or Firm* — Haynes and Boone, LLP; Michael Shenker

(57) ABSTRACT

In gamut mapping, as the brightness of the original color (S) increases further and further beyond the source gamut (110) boundary, the corresponding color (S') in the target gamut (120) becomes closer and closer to a white color (W). Image distortion is reduced as a result.

47 Claims, 2 Drawing Sheets

COMPUTER-IMPLEMENTED GAMUT MAPPING

BACKGROUND OF THE INVENTION

The present invention relates to color processing performed by a computer, and more particularly to gamut mapping.

An image may include a color outside of the gamut of a display device on which the image is to be displayed. In this case, gamut mapping is performed to replace the color with another color in the device's gamut. For example, a digital photographic camera may generate an image with colors outside of the gamut of a computer monitor on which the image must be displayed, i.e. the source gamut 110 (FIG. 1) provided by the camera may contain a color S which is not in the monitor's gamut ("target gamut") 120. The color S is mapped into a color S' which is within the target gamut. The gamut mapping should preferably avoid large image distortion and be computationally inexpensive. See e.g. U.S. Pat. No. 6,560,356 B1 issued May 6, 2003 to Takahashi et al., describing gamut mapping for a color coordinate system L*a*b*.

PCT application published as WO 2005/043887 A1 on 12 May 2005, incorporated herein by reference, describes gamut mapping for a linear RGB color coordinate system. The target gamut 120 consists of all colors whose RGB coordinates are between 0 and 255 inclusive. The gamut mapping from S=(R, G,B) to S'=(R',G',B') is performed in two steps as follows:

1. If at least one of the R, G, B coordinates is negative, the smallest of the negative coordinates (i.e. the negative coordinate of the largest magnitude) is subtracted from each of the R, G, B coordinates. Thus, the vector S=(R,G,B) is replaced with $$S_1 = S - \min(R,G,B) \times (1,1,1) \quad (1)$$

Clearly, all the coordinates of $S_1$ are non-negative. Let us denote them as $R_1, G_1, B_1$.

2. If any of $R_1, G_1, B_1$ is greater than 255, then $S_1$ is scaled to within the target gamut:

$$S' = S_1 * 255 / \max(R_1, G_1, B_1) \quad (2)$$

SUMMARY

This section summarizes some features of the invention. Other features are described in the subsequent sections. The invention is defined by the appended claims which are incorporated into this section by reference.

The inventors have observed that if a color is generated by very bright light, the color looks white or almost white. More particularly, suppose a color is produced by light of radiance $kP(\lambda)$, where k is some multiplier independent of wavelength $\lambda$. (Radiance is defined as the energy per unit of time per unit of wavelength.) As k increases, the corresponding color appears closer and closer to white and less and less dependent on $P(\lambda)$.

Therefore, in some embodiments of the present invention, the gamut mapping S→S' is performed so that when S becomes brighter and brighter, S' gradually converges to a white color regardless of the hue and saturation of S.

The invention is not limited to the features and advantages described above. Other features are described below. The invention is defined by the appended claims.

DESCRIPTION OF SOME EMBODIMENTS

The embodiments described in this section illustrate but do not limit the invention. The invention is defined by the appended claims.

Figure 1:
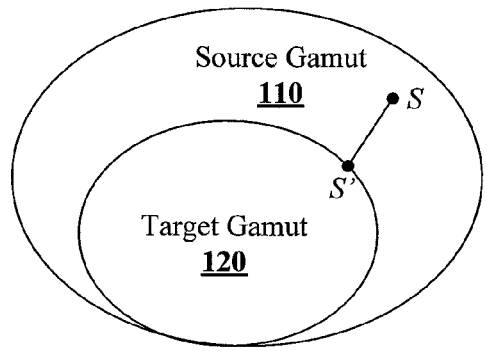
FIG. 1 explains gamut mapping.
Figure 2:
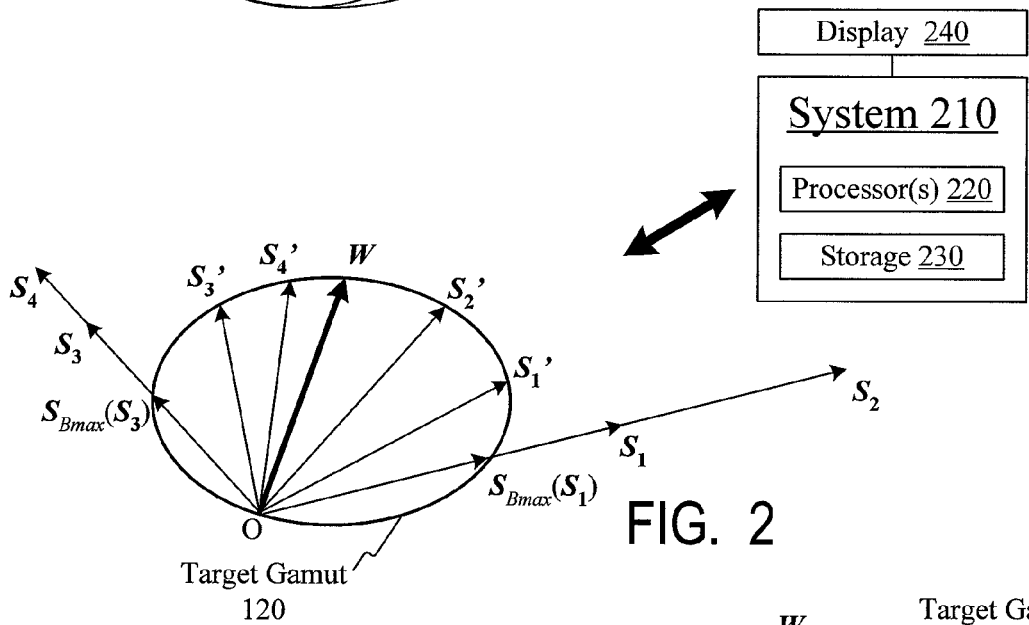
FIGS. 2, 3A, 3B illustrate gamut mappings according to some embodiments of the present invention.

FIG. 2 illustrates some embodiments of the present invention. Gamut mapping is performed by a computer system 210 (possibly a distributed system) having one or more computer processors 220 executing computer instructions stored in a computer storage 230 and/or received over a network (not shown). The colors are represented by digital data stored in a storage 230 and/or received over a network. The images obtained using the gamut mapping are displayed on a display device 240, e.g. a computer monitor, a television monitor, a printer, a holographic display device, and/or other types of devices. Device 240 may incorporate all or part of system 210, and in particular some or all of the gamut mapping can be performed within device 240. In other embodiments, additional gamut mapping is performed by device 240 before and/or after the processing illustrated in FIG. 2.

Colors $S_1$ through $S_4$ (FIG. 2) are outside of target gamut 120, and are mapped into respective colors $S_1'$ through $S_4'$ which are inside gamut 120. Colors are represented as vectors which are denoted by the same symbols as the corresponding colors. W is a white color. Colors $S_1$, $S_2$ are "colinear" in the sense that they can be produced by light sources whose respective radiance functions $P_1(\lambda)$, $P_2(\lambda)$ are multiples of each other, i.e.

$$P_2(\lambda) = kP_1(\lambda) \quad (3)$$

for some positive number k independent of $\lambda$. In this case, we will say that $$S_2 = kS_1 \quad (4)$$

for colors $S_1$ and $S_2$. Intuitively, two colors are colinear if they differ in brightness but have the same hue and saturation (this statement is imprecise, is not tied to any particular definition of hue and saturation, and does not limit the invention). It is easy to see that two colors are colinear if they are represented by colinear vectors in a linear color coordinate system. Also, if condition (4) holds for the colors, it also holds for the corresponding vectors in any linear color coordinate system. (Thus, k is well defined even though a color can be generated by different radiance functions.) For convenience of illustration, we will assume that FIG. 2 represents colors in a linear color coordinate system. The invention is not limited to such color representations however.

In FIG. 2, color $S_3$ is colinear to $S_4$.

White color W is on the boundary of target gamut 120. Thus, if W is produced by a radiance $P_W(\lambda)$, then a color produced by radiance $kP_W(\lambda)$ is outside of gamut 120 for any k>1. Colors $S_1', \ldots, S_4'$ are also on the boundary of gamut 120.

In some embodiments, the gamut mapping satisfies the following condition "GM1":

Condition GM1: When color S is stretched out more and more (i.e. multiplied by greater and greater constants k>1), the corresponding vector S' in the target gamut approaches W in some sense. For example, in a linear color coordinate system, the angle between S' and W may decrease as k increases. In another example, each coordinate of S' approaches the respective coordinate of W.

In FIG. 2, each vector S' (i.e. $S_1'$ through $S_4'$) is in the same plane as the corresponding vector S and W. For a linear color coordinate system, this means that S' is a linear combination of S and W:

$$S'=\alpha(S)S+\beta(S)W \quad (5)$$

for some numerical $\alpha(S)$ and $\beta(S)$. See FIG. 3A. The invention is not limited to S' being in the same plane as S and W however. Of note, in FIG. 3A, the vector W is not on the gamut boundary. Vector $\beta_0 W$ is on the gamut boundary for some positive $\beta_0$. If W is inside gamut 120 (as in FIGS. 2 and 3A), then $\beta_0 \geq 1$. If W is outside of gamut 120, then $\beta_0 < 1$. (It is assumed in this section that the target gamut is convex in the sense that if S is outside gamut 120 then kS is also outside gamut 120 for any k>1; this is not generally necessary however.)

Combining the equation (5) and condition GM1, we obtain for some embodiments that if S is held constant and k approaches infinity, then:

$$\alpha(kS)kS+\beta(kS)W \rightarrow \beta_0 W \quad (6)$$

Hence, at least if S is not colinear to W, then $$\alpha(kS)k \rightarrow 0 \quad (7A)$$

$$\beta(kS) \rightarrow \beta_0 \quad (7B)$$

In some embodiments, if S is colinear to W and is outside of target gamut 120, then $S'=\beta_0 W$, so the conditions (7A), (8A) continue to hold.

The invention is not limited to gamut mappings satisfying the conditions (6), (7A), (7B). Of note, source gamut 110 can be a bounded set, so the functions $\alpha(kS)$, $\beta(kS)$ can be undefined for large k. In some embodiments, regardless of whether or not $\alpha(kS)$, $\beta(kS)$ are defined for arbitrarily large k, the following conditions hold for each fixed S and all positive k such that kS is in source gamut 110 but outside of target gamut 120:

$$\alpha(kS)k \text{ is a non-negative decreasing function of } k \quad (8A)$$

$$\beta(kS) \text{ is a bounded increasing function of } k \quad (8B)$$

As used herein, the terms "increasing" and "decreasing" do not necessarily mean strictly increasing or decreasing. However, in some embodiments, the functions $\alpha(ks)k$ and $\beta(kS)$ are respectively strictly decreasing and strictly increasing for at least some k. In other words, for all ordered pairs $(k_1,k_2)$, $k_1 < k_2$, of positive numbers such that $k_1 S$ and $k_2 S$ are in the source gamut but outside of the target gamut, the following conditions hold true:

$$\alpha(k_1 S)k_1 \geq \alpha(k_2 S)k_2, \text{ and}$$

$$\alpha(k_1 S)k_1 > \alpha(k_2 S)k_2 \text{ for at least one pair } (k_1,k_2); \quad (9A)$$

$$\beta(k_1 S) \leq \beta(k_2 S), \text{ and}$$

$$\beta(k_1 S)k_1 < \beta(k_2 S) \text{ for at least one pair } (k_1,k_2). \quad (9B)$$

In some embodiments, conditions (9A), (9B) hold for all ordered pairs $(k_1,k_2)$, $k_1 < k_2$, of positive numbers such $k_2 S$ is in the source gamut but outside of the target gamut (i.e. $k_1 S$ can be inside the target gamut). If the gamut mapping is clipping, i.e. the colors inside the target gamut are mapped into themselves, then we can set $\beta(S)=0$ and $\alpha(S)=1$ when S is in the target gamut.

In some embodiments, the functions $\alpha$ and $\beta$ are defined as follows. Let $S_{Bmax}(S)$ denote the largest vector colinear to S in target gamut 120. FIG. 2 illustrates $S_{Bmax}(S)$ for vectors $S=S_1$ and $S=S_3$. Clearly, $S_{Bmax}(S_2)=S_{Bmax}(S_1)$, and $S_{Bmax}(S_4)=S_{Bmax}(S_3)$. Intuitively, $S_{Bmax}(S)$ is the brightest color having the same hue and saturation as S in gamut 120. $S_{Bmax}$ is on the gamut boundary. If S is not zero and $S_{Bmax}(S)$ is not zero, then the following condition holds for some k>1:

$$S=kS_{Bmax}(S) \quad (10)$$

where k is a function of S. The number k can be thought of as $|S|/|S_{Bmax}|$ where $|\cdot|$ represents a vector's length. The vector length can be thought of as a measure of brightness. Replacing S with $S_{Bmax}$ in equations (7A), (7B), we obtain for k→∞:

$$\alpha(kS_{Bmax})k \rightarrow 0 \quad (11A)$$

$$\beta(kS_{Bmax}) \rightarrow \beta_0 \quad (11B)$$

In some embodiments, the values $\alpha(S)$ and $\beta(S)$ are entirely defined by k. In this case, we can define $\alpha(k)$ and $\beta(k)$ as follows:

$$\alpha(k)=\alpha(kS_{Bmax}), \beta(k)=\beta(kS_{Bmax}) \quad (12)$$

Then (11A), (11B) can be re-written as (13A), (13B) below. In some embodiments, $\alpha(k)$ and $\beta(k)$ are continuous functions. If the gamut mapping is clipping, i.e. S'=S for all S in gamut 120, then (13C) and (13D) below hold true.

$$\alpha(k)k \rightarrow 0 \text{ as } k \rightarrow \infty \quad (13A)$$

$$\beta(k) \rightarrow \beta_0 \text{ as } k \rightarrow \infty \quad (13B)$$

$$\alpha(1)=1 \quad (13C)$$

$$\beta(1)=0 \quad (13D)$$

Possible choices for $\alpha(k)$ and $\beta(k)$ include:

$$\alpha(k)=1/k^{1+p}$$

$$\beta(k)=\beta_0(1-1/k^q) \quad (14)$$

where p>0 and q>0 are constant with respect to k for a given hue and saturation, i.e. a given $S_{Bmax}$. The numbers p and q may or may not depend on $S_{Bmax}$.

The equations (14) define $\alpha(k)$ and $\beta(k)$ for $k \geq 1$ and for $S_{Bmax}(S)$ being non-colinear to W. Different functions $\alpha(k)$ and $\beta(k)$ (e.g. different p and q values) can be used for different $S_{Bmax}$ values. In some embodiments, $$q=p \quad (15)$$

Good practical results (i.e. little image distortion) have been achieved for (14), (15) when p was independent of $S_{Bmax}$ and was in the range:

$$\frac{1}{3} \leq p \leq \frac{1}{2} \quad (16)$$

e.g. p=½ for all $S_{Bmax}$ values. Of note, p=½ allows computationally inexpensive implementations on many computers due to efficient computation of square roots.

In (10), it was assumed that:

$$S_{Bmax}(S) \neq 0 \quad (17)$$

Figure 4:
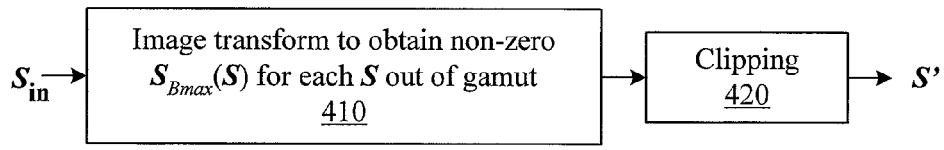
FIG. 4 is a flowchart of gamut mapping according to some embodiments of the present invention.

However, in the RGB example described above in connection with expressions (1) and (2), the condition (17) does not hold if S has a negative RGB coordinate. In some embodiments of the present invention, the gamut mapping is performed in two stages. At stage 410 (FIG. 4), the image is transformed to map the source gamut into a region in which (17) holds for any vector S outside of the target gamut, e.g. the region $R \geq 0$, $G \geq 0$, $B \geq 0$ in the case of equation (1). Step 410 can be accomplished via equation (1) or by other techniques some of which are described below. At stage 420, further gamut mapping (e.g. clipping) is performed as described above in connection with equations (5)-(17).

For illustration, let us apply the techniques (14), (15) to a linear RGB system. Suppose the target gamut consists of all the colors whose R, G, B coordinates are between 0 and 1 inclusive. Color W=(1,1,1) is a white color. Clearly, W is on the target gamut's boundary ($\beta_0$=1). First, step 410 is performed using the equation (1) or some other technique. The colors at the output of step 410 have only non-negative RGB coordinates, but some coordinates may be greater than 1. If a color S=(R,G,B) output by step 410 has max(R,G,B)>1, then $S_{Bmax}(S)$=S/max(R,G,B), and k=max(R,G,B). Therefore, setting q=p in equation (14), we obtain $$S' = \frac{S + (1,1,1)k(k^p - 1)}{k^{1+p}} \quad (18)$$

Good practical results have been achieved for p as in (16), but the invention is not limited to such p values. Of note, (18) is computationally inexpensive, especially if p=½. See Appendix A below for one computer implementation.

In some embodiments, the functions $\alpha(k)$, $\beta(k)$ may or may not satisfy (14) but satisfy the following conditions for any $S_{Bmax}$ non-colinear to W:

$$0 < \alpha(k) \leq 1/k^{1+p}$$

$$1 > \beta(k)/\beta_0 \geq 1 - 1/k^q \quad (19)$$

These functions may or may not be defined for all values of k.

As noted above in the statement of condition GM1, the gamut mapping can be defined in terms of the angle between S and W. If W represents a white color, then this angle can be thought of as chroma (saturation). Denoting the angle between S and W as C and the angle between S' and W as C', we can write $$C' = \phi(S) \quad (20)$$

where $\phi$ is a suitable function. The color S' can be defined by the angle C' and some additional conditions. In some embodiments, S' is defined by the following condition (21):

S' satisfies (20) and lies on the gamut boundary and in the same plane as S and W $\quad (21)$ In some embodiments, for any fixed non-zero S in the source gamut, $$\phi(kS) \to 0 \text{ as } k \to \infty \quad (22)$$

In addition, or alternatively, $\phi(kS)$ can be a decreasing function of k, possibly strictly decreasing for at least some k. In other words, for all ordered pairs $(k_1,k_2)$, $k_1<k_2$, of positive numbers such that $k_1S$ and $k_2S$ are in the source gamut but outside of the target gamut, the following condition holds true:

$$\phi(k_2S) \leq \phi(k_1S), \text{ and}$$

$$\phi(k_2S) < \phi(k_1S) \text{ for at least one pair } (k_1,k_2) \quad (23)$$

In some embodiments, (23) holds for all ordered pairs $(k_1,k_2)$, $k_1<k_2$, of positive numbers such $k_2S$ is in the source gamut but outside of the target gamut (i.e. $k_1S$ can be inside the target gamut). If the gamut mapping is clipping, i.e. the colors in the target gamut are mapped into themselves, then we can set $\phi(S)$=C when S is in the target gamut.

For k as in (10), condition (22) becomes:

$$\phi(kS_{BMax}) \to 0 \text{ as } k \to \infty \quad (24)$$

and (23) becomes:

$$\phi(k_2S_{BMax}) \leq \phi(k_1S_{BMax}), \text{ and}$$

$$\phi(k_2S) < \phi(k_1S) \text{ for at least one pair } (k_1,k_2) \quad (25)$$

In some embodiments, the values $\phi(S)$ are entirely defined by k and C, where k is as in (10) and C is the angle between S and W (and hence between $S_{Bmax}$ and W). In this case, we can write $\phi(kS_{Bmax})$ as $\phi(k,C)$. Then (24) can be re-written as (26A) below. Further, in some embodiments, $\phi(k,C)$ is continuous in k, and satisfies some boundary conditions on the target gamut's boundary. For example, if the gamut mapping is clipping, then (26B) below holds true.

$$\phi(k,C) \to 0 \text{ as } k \to \infty \quad (26A)$$

$$\phi(1,C) = C \quad (26B)$$

Possible choices for $\phi(k,C)$ include:

$$\phi(k,C) = C/k^p \quad (27)$$

where p>0 is constant with respect to k for a given hue and a given saturation C, i.e. for a given $S_{Bmax}$. The number p may or may not be constant with respect to C or other $S_{Bmax}$ parameters.

The equation (27) defines $\phi(k)$ for k≥1 and for $S_{Bmax}(S)$ being non-colinear to W. Different functions $\phi(k)$ (e.g. different p values) can be used for different $S_{Bmax}$ values. In some embodiments, p satisfies (16). In some embodiments, $$0 < \phi(k,C) \leq C/k^p \quad (28)$$

The function $\phi(k,C)$ may or may not be defined for arbitrarily large k.

Figure 3A:
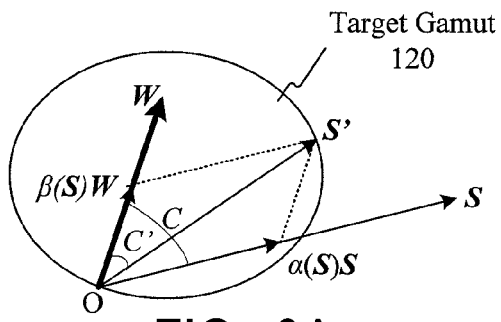
Figure 3B:
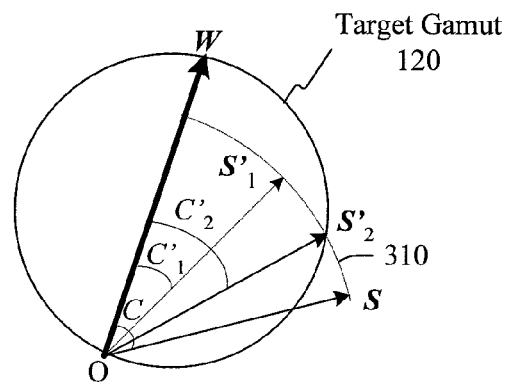

FIG. 3B illustrates another embodiment. A function $\phi$ is chosen as in any of the embodiments described above in connection with formulae (20)-(28), and is applied to a color vector S to obtain a new angle $C'_1=\phi(S)$. $C'_1$ is the chroma of a color vector $S'_1$ having the same hue and length as S. In the particular example of FIG. 3B, the length of S is chosen so that S is outside of gamut 120 but $S'_1$ is inside the gamut. This may happen, for example, if the gamut's cross section by the plane passing through vectors S and W is other than a circle centered at the origin O. Such gamuts are not uncommon. Of course, the gamut's shape depends on the color coordinate system. Many display devices, including many computer monitors, have "non-circular" gamut representations in linear color coordinate systems (i.e. the gamuts' planar cross sections passing through the origin are not circles centered at the origin). Further, in many computer monitors and some other display devices, given a fixed hue H (the hue can be defined so as to be constant in a planar cross section passing through the origin), the maximum brightness increases as the color becomes closer to white (i.e. as the chroma C decreases). Defining the brightness as the color vector's length (the invention is not limited to this definition however), in many display devices the maximum possible brightness $B_{max}$(C,H)=$|S_{Bmax}(S)|$ is a decreasing function of C, and is strictly decreasing throughout the range of all the possible C values or at least in a sub-range of the possible C values. Therefore, S might be such that $|S| > B_{max}(C,H)$ but $|S'_1| \leq B_{max}(C',H)$, i.e. S is outside of the gamut 120 but S', is inside the gamut as in FIG. 3B.

In some gamut mapping embodiments, S is mapped into $S'_1$ even if $S'_1$ is not on the gamut boundary. In other embodiments, S is mapped into a vector $S'_2$ which has the same length as S and lies on the gamut boundary. The chroma $C'_2$ of $S'_2$ is less than C but greater than $C'_1$. More particularly, FIG. 3B shows a circular arc 310 with the center at the origin O and the radius equal to the length of S. The arc lies in the same plane as S and W. Arc 310 intersects the gamut boundary somewhere between the vectors S and W, and the point of intersection defines the vector $S'_2$. Thus, the gamut mapping is defined as follows: vector S outside of the target gamut is mapped into a vector S' which lies on the gamut boundary and in the same plane as S and W and has a chroma C' defined as follows:

$$C' = C'_1 \text{ if } B_{max}(C'_1, H) \leq |S|$$

$$C' = C'_2 \text{ if } B_{max}(C'_1, H) > |S| \quad (28.1)$$

A portion of arc 310 to the right of W corresponds to colors having different chroma values C but having the same brightness B and the hue H as the color S. Clearly, $C'_2$ is the maximum chroma value for such colors. Denote $C'_2 = C_{max}(B, H)$. Then the mapping (28.1) can be represented as follows:

$$C' = \max(C'_1, C'_2) \quad (28.2A)$$

or, equivalently, $$C' = \max(\phi(S), C_{max}(B,H)) \quad (28.2B)$$

$C_{max}(B,H)$ may be undefined for some B values, e.g if B is larger than the maximum brightness in gamut 120. In such cases, we can set $C' = C'_1$. For example, we can define:

$$\phi_1(S) = \max(\phi(S), C_{max}(B,H)) \text{ if } C_{max}(B,H) \text{ is defined,}$$

$$\phi_1(S) = \phi(S) \text{ if } C_{max}(B,H) \text{ is undefined.} \quad (28.3)$$

Then, $$C' = \phi_1(S) \quad (28.4)$$

If gamut 120 is bounded, and $\phi(S)$ satisfies (22), then $\phi_1(S)$ also satisfies (22) since $\phi_1(S) = \phi(S)$ for large k. Further, in some display devices (including many computer monitors), $C_{max}(B,H)$ is a decreasing function of B, and is strictly decreasing in the range of all the possible B values or at least in some sub-range of the possible B values. (Of note, if $B_{max}(C,H)$ is a decreasing or strictly decreasing function of C, and the target gamut is convex, then $C_{max}(B,H)$ will also be respectively a decreasing or strictly decreasing function of B.) For such gamuts, if $\phi(S)$ decreases in $|S|$, then $\phi_1(S)$ also decreases in $|S|$. If $\phi(S)$ satisfies one or more of (23)-(26B), then $\phi_1(S)$ also satisfies the same one or more of (23)-(26B) at least if $C_{max}(B,H)$ is strictly decreasing throughout the range of possible B values (and possibly even if $C_{max}(B,H)$ is not strictly decreasing throughout).

We will now discuss some appropriate ways to define an angle between two colors. In a linear coordinate system, the angle between colors S and W can be defined as:

$$\cos^{-1}\frac{(S, W)}{|S||W|}$$

where (S,W) is the dot product of S and W, and |•| denotes a vector's length. The dot product can be defined in different ways, for example:

$$(S, W) = s_1 w_1 + s_2 w_2 + s_3 w_3 \quad (29)$$

where $(s_1, s_2, s_3)$ and $(w_1, w_2, w_3)$ are coordinates of S and W respectively. The equation (29) is the usual dot product definition when the coordinate system is orthonormal, i.e. the coordinate axes are mutually orthogonal and the unit vector along each coordinate has a unit length. Orthonormality can be defined as in U.S. patent application Ser. No. 11/432,221 filed May 10, 2006 by S. N. Bezryadin et al., entitled "EDITING OF DIGITAL IMAGES, INCLUDING (BUT NOT LIMITED TO) HIGHLIGHTING AND SHADOWING OF IMAGE AREAS", published as no. 2007/0146831 A1 on Jun. 28, 2007, incorporated herein by reference. More particularly, a linear color coordinate system is called orthonormal if its color matching functions (CMF's) $\bar{t}_1$, $\bar{t}_2$, $\bar{t}_3$ form an orthonormal system in $L_2$ on $[0,\infty)$ (or on any interval containing the visible range of the $\lambda$ values if the color matching functions are zero outside of this range). In other words:

$$\int \bar{t}_1(\lambda)\bar{t}_2(\lambda)d\lambda = \int \bar{t}_1(\lambda)\bar{t}_3(\lambda)d\lambda = \int \bar{t}_2(\lambda)\bar{t}_3(\lambda)d\lambda = 0$$

$$\int [\bar{t}_1(\lambda)]^2 d\lambda = \int [\bar{t}_2(\lambda)]^2 d\lambda = \int [\bar{t}_3(\lambda)]^2 d\lambda = K \quad (30)$$

where the integration is over the entire $L_2$ interval (e.g. $[0,\infty)$ or the visible range), and K is a positive constant dependent on the measurement units chosen for the wavelength $\lambda$ and the radiance $P(\lambda)$. The units can be chosen so that K=1.

The integrals in (30) can be replaced with sums if the CMF's are defined at discrete $\lambda$ values, i.e.:

$$\sum_\lambda \bar{t}_1(\lambda)\bar{t}_2(\lambda) = \sum_\lambda \bar{t}_2(\lambda)\bar{t}_3(\lambda) = \sum_\lambda \bar{t}_1(\lambda)\bar{t}_3(\lambda) = 0 \quad (31)$$

$$\sum_\lambda [\bar{t}_1(\lambda)]^2 = \sum_\lambda [\bar{t}_2(\lambda)]^2 = \sum_\lambda [\bar{t}_3(\lambda)]^2 = K$$

where the sums are taken over a discrete set of the $\lambda$ values. The constant K can be different than in (30).

One orthonormal system, DEF, is described in the aforementioned U.S. patent application Ser. No. 11/432,221. DEF can be defined as a linear transformation of the 1931 CIE XYZ color coordinate system for a 2° field as follows:

$$\begin{bmatrix} D \\ E \\ F \end{bmatrix} = A_{XYZ-DEF} \begin{bmatrix} X \\ Y \\ Z \end{bmatrix} \quad (32)$$

where:

$$A_{XYZ-DEF} = \begin{bmatrix} 0.205306 & 0.712507 & 0.467031 \\ 1.853667 & -1.279659 & -0.442859 \\ -0.365451 & 1.011998 & -0.610425 \end{bmatrix} \quad (33)$$

The DEF system's CMF's $\bar{d}(\lambda)$, $\bar{e}(\lambda)$, $\bar{f}(\lambda)$ corresponding to the respective coordinates D, E, F can therefore be obtained from the XYZ CMF's $\bar{x}(\lambda)$, $\bar{y}(\lambda)$, $\bar{z}(\lambda)$ corresponding to the respective coordinates X, Y, Z using the matrix $A_{XYZ-DEF}$:

$$\begin{bmatrix} \bar{d}(\lambda) \\ \bar{e}(\lambda) \\ \bar{f}(\lambda) \end{bmatrix} = A_{XYZ-DEF} \begin{bmatrix} \bar{x}(\lambda) \\ \bar{y}(\lambda) \\ \bar{z}(\lambda) \end{bmatrix}$$

The D axis (FIG. 5) of the DEF system represents multiples of the CIE $D_{65}$ white color standard. Thus, W can be chosen as parallel to the D axis. The F axis represents the monochromatic red color with $\lambda$=700 nm. The visible gamut is a non-circular cone with the vertex at the origin O, extending upward from the origin. The source gamut 110 (FIG. 6) can be the entire visible gamut or some other gamut. For example, the source gamut may include infrared, ultraviolet, X-ray, or other colors detectable by a suitable camera.

Figure 5:
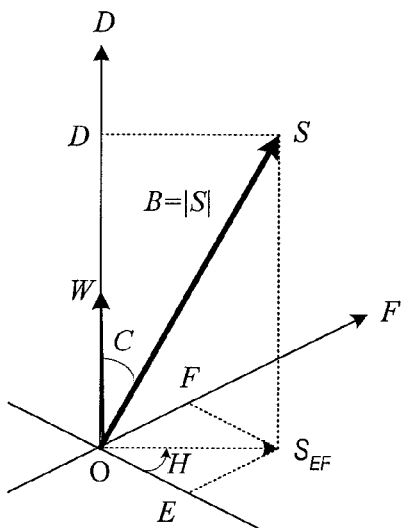
FIG. 5 illustrates a color coordinate system suitable for gamut mapping according to some embodiments of the present invention.
Figure 6:
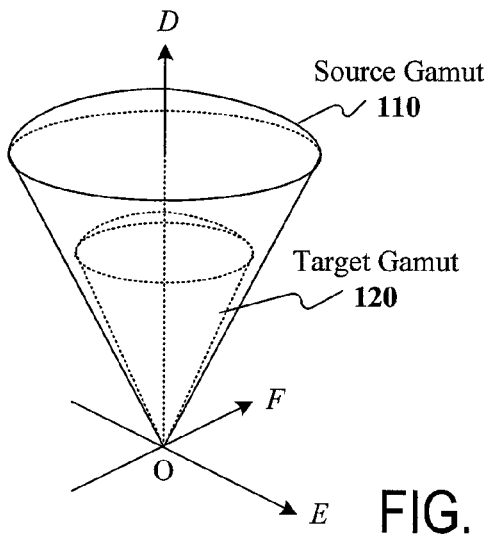
FIG. 6 illustrates a visible gamut and a target gamut in the color coordinate system of FIG. 5.

Also described in the aforementioned U.S. patent application Ser. No. 11/432,221 and illustrated in FIG. 5 is a spherical coordinate system BCH (Brightness, Chroma, Hue) based on DEF. For any color S=(D,E,F), its BCH coordinates are:

$$B = \sqrt{D^2 + E^2 + F^2} = |S|$$

C ("chroma") is the angle between the vector S and the D axis (and hence between S and W);

H ("hue") is the angle between (i) the orthogonal projection $S_{EF}$ of the vector S on the EF plane and (ii) the E axis.

The BCH coordinate system is convenient for some embodiments of (20)-(28.4).

Figure 7:
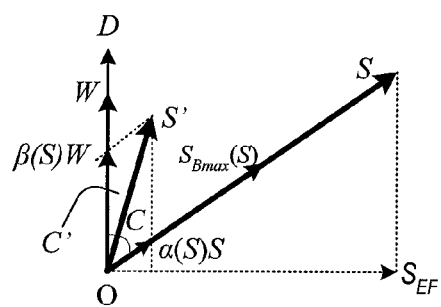
FIGS. 7-9 illustrate gamut mapping according to some embodiments of the present invention.

In some embodiments (FIG. 7), for each color S outside of gamut 120 and such that $S_{Bmax}(S)$ is not zero (as in (17)), S' is obtained according to one or more of formulae (20)-(28.4). Hence, the hue H is unchanged.

This mapping can also be performed using suitable α and β functions as in FIG. 3A and equation (5). It is clear from the geometry of FIG. 7 that:

$$|\alpha(S)S| = |S'|\sin C'/\sin C \quad (34)$$

and hence $$\alpha(S) = \frac{|S'|\sin C'}{|S|\sin C} \quad (35)$$

Using the sine theorem for the triangle formed by the D axis, the S' vector, and the line parallel to S and passing through the end of S', we obtain:

$$\frac{|\beta(S)W|}{\sin(C - C')} = \frac{|S'|}{\sin C}$$

and therefore $$\beta(S) = \frac{|S'|\sin(C - C')}{|W|\sin C}$$

Denoting now $\alpha(k) = \alpha(kS_{Bmax})$ and $\beta(k) = \beta(kS_{Bmax})$ as in (12), and assuming that B'=|S'| changes slowly with respect to B=|S| and hence with respect to k=|S|/|$S_{Bmax}(S)$|, and further noting that $S_{Bmax}(S)$ and sin C are independent of k, we see from (35) that $$\alpha(k)k \approx c_1 \times \sin C'$$

where $c_1$ is a positive constant. For small C', sin C'≈C', so $$C' \approx c_2 \times \alpha(k)k$$

where $c_2$ is a positive constant. If k=1, then S'=S in the gamut clipping case, and hence C'=C. Further (see (13C)), α(1)=1. Therefore, $c_2$=1 for small C. If α(k) is as in (14) for example, then C' is roughly as in (27) at least for small C.

Turning now to step 410 (FIG. 4), let us denote the input colors as $S_{in}$, the colors output by step 410 as $S_{out}$, and the output of step 420 as S'. The subscript "in" will be used for the $S_{in}$ coordinates, e.g. $S_{in} = (B_{in}, C_{in}, H_{in})$. The subscript "out" will be used for the $S_{out}$ coordinates. The apostrophe will be used for the S' coordinates, e.g. S'=(B',C',H').

Figure 8:
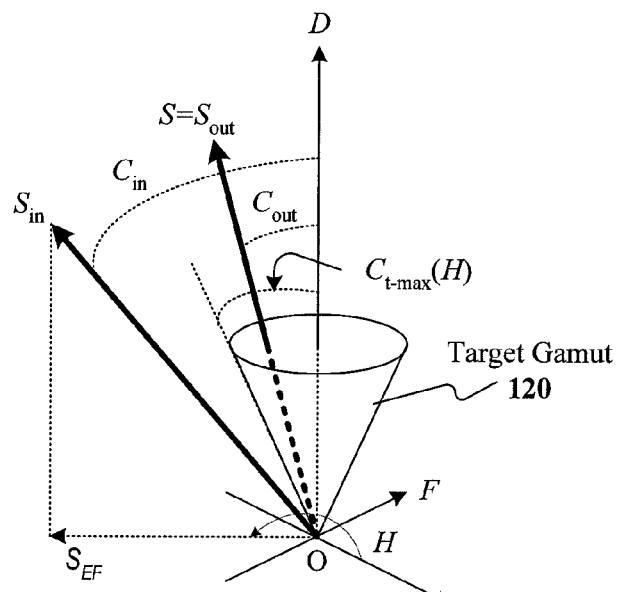

In some embodiments, step 410 involves rotating each vector $S_{in}$ that does not satisfy (17), without changing the hue H and without changing the brightness B. See FIG. 8. The rotation is therefore performed in the plane containing $S_{in}$ and its projection $S_{EF}$. If target gamut 120 contains vectors with a non-zero chroma (C) for this hue value, let $C_{t-max}(H)$ denote the maximum chroma. In FIG. 8, the target gamut is a circular cone symmetric with respect to the D axis, so $C_{t-max}(H)$ is constant (i.e. independent of H). Other embodiments have non-constant $C_{t-max}(R)$. In FIG. 8, for each hue H, the target gamut 120 contains a non-zero vector with chroma equal to $C_{t-max}(R)$. If such a vector does not exist for some H, i.e. if the maximum chroma is reached only for the zero vector, then we can set $C_{t-max}(H)$ to a slightly smaller positive value for which a non-zero vector exists in the target gamut.

Step 410 maps $C_{in}$ into $C_{out}$ according to some function $f$:

$$C_{out} = f(C_{in}, H) \text{ such that } C_{out} < C_{t-max}(H) \quad (36)$$

Figure 9:
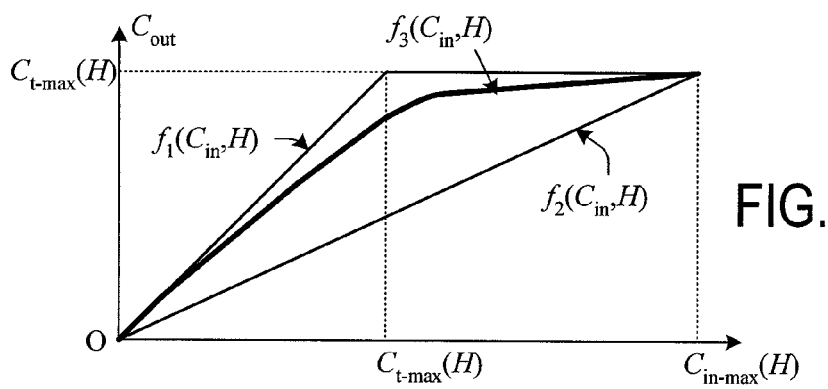

$S_{out}$ satisfies (17). FIG. 9 illustrates some possible mappings $f$. Three mappings are illustrated. The mapping $f_1$ is clipping:

$$C_{out} = C_{in} \text{ if } C_{in} < C_{t-max}(H)$$

$$C_{out} = C_{t-max}(H) \text{ if } C_{in} \geq C_{t-max}(H) \quad (37)$$

The mapping $f_2$ is linear compression:

$$C_{out} = C_{in} \times C_{t-max}(H) / C_{in-max}(H) \quad (38)$$

where $C_{in-max}(H)$ is the maximum saturation for the hue H in the source gamut. $C_{in-max}(H) \leq C_{t-max}(R)$. The mapping $f_3$ is some function between $f_2$ and $f_1$. Other mappings are also possible.

Combining (36) with (20)-(28.4), i.e. combining the steps 410 and 420, we obtain for some embodiments:

$$C' = \phi_2(B_{in}, C_{in}, H_{in}) \quad (39)$$

where for fixed $C_{in}$ and $H_{in}$:

$$\phi_2(B_{in}, C_{in}, H_{in}) \to 0 \text{ as } B_{in} \to \infty \quad (40)$$

and/or $\phi_2(B_{in}, C_{in}, H_{in})$ is a decreasing function of $B_{in}$ at least when $B_{in}$ is sufficiently large, i.e. larger than the maximum brightness $B_{max}(f(C_{in}, H_{in}), H_{in})$ in the target gamut for hue $H_{in}$ and saturation $f(C_{in}, H_{in})$. The function $\phi_2(B_{in}, C_{in}, H_{in})$ is possibly strictly decreasing in $B_{in}$ for at least some values of $B_{in} >$ $$B_{max}(f(C_{in}, H_{in}), H_{in}) \quad (41)$$

The function $\phi_2$ can be equal to either $\phi$ or $\phi_1$. In some embodiments, $\phi_2(B_{in}, C_{in}, H_{in})$ is constant in $B_{in}$ if $C_{in}$ and $H_{in}$ are fixed and $B_{in} < B_{max}(f(C_{in}, H_{in}), H_{in})$ because step 410 maps the color $(B_{in}, C_{in}, H_{in})$ into the target gamut in this case and step 420 makes no further changes to the color.

In some embodiments, S' is obtained as follows for each $S_{in}$ outside of target gamut 420:

H'=$H_{in}$

C' as in (39)-(41)

B'=min($B_{in}, B_{max}(C', H_{in})$) where $B_{max}(C', H_{in})$ is the maximum brightness in the target gamut for the chroma C' and saturation $H_{in}$.

Combining (36) with (27), we obtain for some embodiments:

$$C' = f(C_{in}, H_{in})/B_{in}{}^p \ast B_{max}(f(C_{in}, H_{in}), H_{in})^p \quad (42)$$

or, denoting $f(C_{in}, H_{in}) \ast B_{max}(f(C_{in}, H_{in}), H_{in})^p$ as simply $g(C_{in}, H_{in})$:

$$C' = g(C_{in}, H_{in})/B_{in}{}^p \quad (43)$$

where p is independent of $B_{in}$. In some embodiments, p is also independent of $C_{in}$ and/or $H_{in}$. In some embodiments, p satisfies (16). S' is then obtained by setting H'=$H_{in}$ and B'=min($B_{in}, B_{max}(C', H_{in})$).

Combining (36) with (5), (6), (7A), (7B), we obtain for some embodiments:

$$S' = \alpha(S_{in})S_{in} + \beta(S_{in})W$$

where for a fixed $S_{in}$ and $k \to \infty$:

$$\alpha(kS_{in})kS_{in} + \beta(kS_{in})W \to \beta_0 W \quad (44)$$

i.e.

$$\alpha(kS_{in})k \to 0 \quad (45A)$$

$$\beta(kS_{in}) \to \beta_0 \quad (45B)$$

Combining (36) with (9A), (9B), we obtain for some embodiments that for all ordered pairs $(k_1, k_2)$, $k_1 < k_2$, of positive numbers such that $k_1 S_{in}$ and $k_2 S_{in}$ are in the source gamut but outside of the target gamut, the following conditions hold true:

$$\alpha(k_1 S_{in})k_1 \geq \alpha(k_2 S_{in})k_2, \text{ and}$$

$$\alpha(k_1 S_{in})k_1 > \alpha(k_2 S_{in})k_2 \text{ for at least one pair } (k_1, k_2); \quad (46A)$$

$$\beta(k_1 S_{in}) \leq \beta(k_2 S_{in}), \text{ and}$$

$$\beta(k_1 S_{in})k_1 < \beta(k_2 S_{in}) \text{ for at least one pair } (k_1, k_2). \quad (46B)$$

In some embodiments, conditions (46A), (46B) hold for all ordered pairs $(k_1, k_2)$, $k_1 < k_2$, of positive numbers such $k_2 S_{in}$ is in the source gamut but outside of the target gamut (i.e. $k_1 S_{in}$ can be inside the target gamut).

In some embodiments, the orthonormality conditions (30) or (31) are replaced with quasi-orthonormality conditions, i.e. the equations (30) or (31) hold only approximately. More particularly, CMF's $\overline{t_1}(\lambda)$, $\overline{t_2}(\lambda)$, $\overline{t_3}(\lambda)$ will be called herein quasi-orthonormal with an error at most $\epsilon$ if they satisfy the following conditions:
1. each of $\int \overline{t_1}(\lambda)\overline{t_2}(\lambda) d\lambda$, $\int \overline{t_1}(\lambda)\overline{t_3}(\lambda) d\lambda$, $\int \overline{t_2}(\lambda)\overline{t_3}(\lambda) d\lambda$ is in the interval $[-\epsilon, \epsilon]$, and
2. each of $\int [\overline{t_1}(\lambda)]^2 d\lambda$, $\int [\overline{t_2}(\lambda)]^2 d\lambda$, $\int [\overline{t_3}(\lambda)]^2 d\lambda$ is in the interval $[K-\epsilon, K+\epsilon]$, for positive constants K and $\epsilon$. In some embodiments, $\epsilon$ is 0.3K, or 0.1K, or some other value at most 0.3K, or some other value. Alternatively, the CMF's will be called quasi-orthonormal with an error at most $\epsilon$ if they satisfy the following conditions:

1. each of $\sum_{\lambda} \overline{t_1}(\lambda)\overline{t_2}(\lambda)$, $\sum_{\lambda} \overline{t_1}(\lambda)\overline{t_3}(\lambda)$, $\sum_{\lambda} \overline{t_2}(\lambda)\overline{t_3}(\lambda)$ is in the interval $[-\varepsilon, \varepsilon]$, and 2. each of $\sum_{\lambda} [\overline{t_1}(\lambda)]^2$, $\sum_{\lambda} [\overline{t_2}(\lambda)]^2$, $\sum_{\lambda} [\overline{t_3}(\lambda)]^2$ is in the interval $[K - \varepsilon, K + \varepsilon]$ for positive constants K and $\epsilon$. In some embodiments, $\epsilon$ is 0.3K, or 0.1K, or some other value at most 0.3K, or some other value. Orthonormal functions are quasi-orthonormal, but the reverse is not always true. If $\epsilon = 0.1K$, the functions will be called 90%-orthonormal. More generally, the functions will be called n%-orthonormal if $\epsilon$ is (100−n)% of K. For example, for 70%-orthonormality, $\epsilon = 0.3K$.

The invention is not limited to the embodiments described above. Some embodiments include a computer-implemented method for mapping image data into a target gamut, the image data representing an image which comprises one or more colors S each of which satisfies a condition (G1) which is as follows:

(G1) S is outside of the target gamut but a color cS is inside the target gamut for at least one positive c.

The method comprises at least the following operation (and may include additional operations not recited below, the term "comprises" being synonymous to "includes"): for each color S satisfying the condition (G1), a color S' is generated to map the color S into the color S', wherein $$S' = \alpha(S)S + \beta(S)W$$

wherein the plus operation "+" denotes addition of colors in the sense that the color S' can be produced by combining light sources producing the individual colors $\alpha(S)S$, $\beta(S)W$ (equivalently, the "+" operation is addition in a linear color coordinate system). In this equation:

(i) S' is in the target gamut, or at least in some neighborhood of the target gamut, i.e. in an "$\epsilon_G$-neighborhood" of the target gamut. In other words, a color $$(1 - \epsilon_G)S'$$

is in the target gamut, where $\epsilon_G$ is a predefined non-negative constant independent of S and not exceeding 1/10, or 1/20, or even a smaller bound. Further:

(ii) W is a predefined color independent of S, where W is not zero in a linear color coordinate system, and where uW is inside the target gamut for at least one u>0. W can be a white color. Further, (iii) $\alpha(S)$ and $\beta(S)$ are non-negative, and satisfy one or both of conditions (A) and (B), the conditions (A) and (B) being as follows:

(A) when k>0 and k→∞, then
$\alpha(kS)k \to 0$ and
$\beta(kS) \to \beta_0$,
where $\beta_0$ is a positive number independent of S;

(B) for all pairs $(k_1, k_2)$ of positive numbers which satisfy both conditions (B1) and (B2) below, $\alpha(\cdot)$ and $\beta(\cdot)$ satisfy (B3) and (B4) below:

(B1) pair $(k_1, k_2)$ is ordered, such that $k_1 < k_2$. Alternatively, $(k_1, k_2)$ may or may not be ordered but is "$\epsilon_M$-ordered", i.e. $k_2 > k_1(1 + \epsilon_M)$ for some predefined non-negative number $\epsilon_M$ independent of S. In some embodiments, $\epsilon_M$ does not exceed 1/10, or 1/20, or even a smaller bound.

(B2) $k_1 S$ and $k_2 S$ are outside of the target gamut.

(B3) $\beta(k_2 S) \geq \beta(k_1 S)$, and
$\beta(k_2 S) > \beta(k_1 S)$ for at least one pair $(k_1, k_2)$ satisfying (B1) and (B2).

(B4) $\alpha(k_2 S)k_2 \leq \alpha(k_1 S)k_1$, and
$\alpha(k_2 S)k_2 < \alpha(k_1 S)k_1$ for at least one pair $(k_1, k_2)$ satisfying (B1) and (B2).

In some embodiments, the mapping operation is also performed for each color S which is represented by the image data but does not satisfy the condition (G1).

In some embodiments, the mapping operation corresponds to just step 420 or to a combination of steps 410, 420. Thus, in some embodiments, the mapping operation is step 420 and is preceded by another operation in which for each color $S_{in}$ which is outside of the target gamut and does not satisfy the condition (G1), is replaced with a color S which satisfies the condition (G1).

In some embodiments, S' is on the target boundary, or at least in an $\epsilon_G$-neighborhood of the target gamut's boundary, i.e. kS' is outside of the target gamut for each $k > 1 + \epsilon_G$.

In some embodiments, $0<\alpha(k)\leq 1/k^{1+p}$ and $1>\beta(k)/\beta_0 \geq 1-1/k^q$ when $k\geq 1$, wherein $\alpha(k)$ and $\beta(k)$ are functions such that for each said color S satisfying the condition (G1), $$\alpha(k)=\alpha(kS_{Bmax}(S)) \text{ and } \beta(k)=\beta(kS_{Bmax}(S))$$

where $S_{Bmax}(S)$ is colinear to S and is on the target gamut's boundary, where p and q are numbers which are constant with respect to k.

Some embodiments include a computer-implemented method for mapping image data into a target gamut, the image data representing an image which comprises one or more colors S each of which satisfies the condition (G1), the method comprising, for each color S satisfying the condition (G1), generating a color S' to map the color S into the color S', wherein $$S'=\alpha(S)S+\beta(S)W$$

wherein:

(i) S' is in an $\epsilon_G$-neighborhood of the target gamut's boundary, where $\epsilon_G$ is a predefined non-negative constant independent of S and not exceeding 1/10 or 1/20 or some other bound;

(ii) W is a predefined color independent of S, where W is not zero in a linear color coordinate system, and where uW is inside the target gamut for at least one u>0;

(iii) $\alpha(S)$ and $\beta(S)$ are non-negative, and $\beta(\cdot)$ satisfies one or both of conditions (A) and (B), the conditions (A) and (B) being as follows:

(A) when k>0 and k→∞

$\beta(kS) \to \beta_0$, where $\beta_0$ is a positive number independent of S;

(B) for all pairs $(k_1,k_2)$ of positive numbers which satisfy both conditions (B1) and (B2) below $\beta(\cdot)$ satisfies (B3) below, wherein the condition (B1) is specified for a predefined non-negative number $\epsilon_M$ independent of S and not exceeding 1/10 or 1/20 or some other bound:

(B1) pair $(k_1,k_2)$ is $\epsilon_M$-ordered, i.e. $k_2 > k_1(1+\epsilon_M)$;

(B2) $k_1 S$ and $k_2 S$ are outside of the target gamut;

(B3) $\beta(k_2 S) \geq \beta(k_1 S)$, and $\beta(k_2 S) > \beta(k_1 S)$ for at least one pair $(k_1,k_2)$ satisfying (B1) and (B2).

In some embodiments, the mapping operation is also performed for each color S which is represented by the image data but does not satisfy the condition (G1).

Some embodiments include a computer-implemented method for mapping input image data representing an image into a target gamut, the image data representing an image which comprises one or more colors S each of which satisfies the condition (G1), the method comprising: for each color vector S specifying a color satisfying the condition (G1), performing a mapping operation generating a color vector S' to map S into S', wherein the vector S' forms an angle C' with a predefined non-zero color vector W in an $\epsilon$-orthonormal linear color coordinate system where $\epsilon$ is at least 70%, or at least 90%, or at least some other number, the color vector W being independent of S and such that uW is inside the target gamut for at least one u>0, wherein $$C'=\Phi(S)$$

wherein:

(i) S' is in an $\epsilon_G$-neighborhood of the target gamut, where $\epsilon_G$ is a predefined non-negative constant independent of S and not exceeding 1/10 or 1/20 or some other bound;

(ii) $\Phi(\cdot)$ is a predefined function satisfying one or both of conditions (A) and (B), the conditions (A) and (B) being as follows:

(A) when k>0 and k→∞, then $\Phi(kS) \to 0$;

(B) for all pairs $(k_1,k_2)$ of positive numbers which satisfy both conditions (B1) and (B2) below, $\Phi$ satisfies (B3) below, wherein the condition (B1) is specified for a predefined non-negative number $\epsilon_M$ independent of S and not exceeding 1/10 or 1/20 or some other bound:

(B1) pair $(k_1,k_2)$ is $\epsilon_M$-ordered;

(B2) $k_1 S$ and $k_2 S$ are outside of the target gamut;

(B3) $\Phi(k_2 S) \leq \Phi(k_1 S)$, and $\Phi(k_2 S) < \Phi(k_1 S)$ for at least one pair $(k_1,k_2)$ satisfying (B1) and (B2).

For example, $\phi$ can be any of the functions $\phi$, $\phi_1$, $\phi_2$ discussed above in connection with (20)-(41).

In some embodiments, the mapping operation is also performed for each color S which is represented by the image data but does not satisfy the condition (G1).

In some embodiments, $$0 < \Phi(S) \leq C/k^p$$

where C is the angle between S and W, and k is such that $$S = kS_{Bmax}(S)$$

where $S_{Bmax}(S)$ is colinear to S and is on the boundary of the target gamut, where p is a positive number which is constant with respect to k.

The invention provides a computer system programmed to perform any one or more of the methods described above, and one or more computer readable media comprising one or more computer instructions operable to cause a computer system to perform any one or more of the methods described above. The methods can be performed by a combination of software programmed parts and/or hardwired circuitry. The invention includes software products (computer program products) for programming computers to perform one or more of the gamut mapping operations described above. The invention includes transmitting one or more computer instructions over a network, wherein the one or more computer instructions are operable to cause a computer system to perform any one or more of the methods described above. In particular, the invention includes downloading such instructions over a network. The invention includes electromagnetic signals carrying such programs and instructions.

The invention is not limited to the embodiments described above. For example, the target gamut 120 does not have to be the gamut of display device 240 but can be some intermediate gamut. Thus, if device 240 is a printer, gamut 120 can be an RGB gamut which can be conveniently converted to the printer's gamut. W does not have to be any particular white color standard, and may be a non-white color. Other embodiments and variations are within the scope of the invention, as defined by the appended claims.

APPENDIX A

```
//Gamut mapping for linear RGB system. Target gamut is the set of
// all colors with RGB coordinates from 0 to 1 inclusive.
// Source gamut has only non-negative RGB coordinates
void run( _cmss_vector &vector ) const    //vector=S=(R,G,B)
{
    float _max = 0; // _max = max (R,G,B) = k
    int _pos;
    for( _pos = 0; _pos < 3; _pos++ )
    {
        if( _max < vector [_pos] )
        {
            _max = vector [_pos];
        }
    }
    if( _max > 1.0f ) //if S is outside target gamut
    {
// Angle decreasing; here p=1/2
```

APPENDIX A-continued

```
    float _coeff = sqrtf( _max ); //_coeff=k^p
// White addition
    float _white = ( _coeff - 1.0f ) * _max; //_white=k(k^p-1)
    for( _pos = 0; _pos < 3; _pos++ )
    {
        vector[ _pos ] = ( vector[ _pos ] + _white )/( _coeff * _max );
                                            //vector=S' as in (18)
    }
    }
}
```

The invention claimed is:

1. A computer-implemented method for mapping first image data into a target gamut, the first image data representing an image which comprises one or more colors S each of which satisfies a condition (G1) which is as follows:

(G1) S is outside of the target gamut but a color cS is inside the target gamut for at least one positive c, the method comprising one or more computer processors receiving at least part of the first image data from a computer storage and/or a network and executing one or more computer instructions that process the at least part of the first image data to generate second image data, wherein generating the second image data comprises, for each color S satisfying the condition (G1), performing a mapping operation by the one or more computer processors executing the one or more computer instructions, the mapping operation causing the second image data to represent a color S' to map the color S into the color S', wherein $$S'=\alpha(S)S+\beta(S)W$$

wherein:

(i) S' is in an $\epsilon_G$-neighborhood of the target gamut, i.e. a color $$(1-\epsilon_G)S'$$

is in the target gamut, where $\epsilon_G$ is a predefined non-negative constant independent of S and not exceeding $1/10$;

(ii) W is a predefined color independent of S, where W is not zero in a linear color coordinate system, and where uW is inside the target gamut for at least one u>0;

(iii) $\alpha(S)$ and $\beta(S)$ are non-negative, and satisfy one or both of conditions (A) and (B), the conditions (A) and (B) being as follows:

(A) when k>0 and k→∞, then $\alpha(kS)k \to 0$ and $\beta(kS) \to \beta_0$, where $\beta_0$ is a positive number independent of S;

(B) for all pairs $(k_1, k_2)$ of positive numbers which satisfy both conditions (B1) and (B2) below, $\alpha(\bullet)$ and $\beta(\bullet)$ satisfy (B3) and (B4) below, wherein the condition (B1) is specified for a predefined non-negative number $\epsilon_M$ independent of S and not exceeding $1/10$:

(B1) pair $(k_1, k_2)$ is $\epsilon_M$-ordered, i.e. $k_2 > k_1(1+\epsilon_M)$;

(B2) $k_1 S$ and $k_2 S$ are outside of the target gamut;

(B3) $\beta(k_2 S) \geq \beta(k_1 S)$, and $\beta(k_2 S) > \beta(k_1 S)$ for at least one pair $(k_1, k_2)$ satisfying (B1) and (B2);

(B4) $\alpha(k_2 S)k_2 \leq \alpha(k_1 S)k_1$, and $\alpha(k_2 S)k_2 < \alpha(k_1 S)k_1$ for at least one pair $(k_1, k_2)$ satisfying (B1) and (B2).

2. The method of claim 1 wherein the mapping operation is also performed, by the one or more computer processors executing one or more computer instructions, for each color S which is represented by the image data but does not satisfy the condition (G1).

3. The method of claim 1 wherein the image comprises one or more colors $S_{in}$ each of which is outside of the target gamut and does not satisfy the condition (G1);

wherein the method further comprises modifying the first image data by the one or more computer processors executing one or more computer instructions to obtain modified first image data representing modified colors such that each said color $S_{in}$ is replaced with a modified color which satisfies the condition (G1);

wherein the mapping operation is performed on the modified first image data for at least one modified color.

4. The method of claim 1 wherein S' is in an $\epsilon_G$-neighborhood of the target gamut's boundary, i.e. kS' is outside of the target gamut for each $k>1+\epsilon_G$.

5. The method of claim 1 where W represents a white color.

6. The method of claim 4 wherein $\alpha$ and $\beta$ satisfy the condition (A).

7. The method of claim 4 wherein $\alpha$ and $\beta$ satisfy the condition (B).

8. The method of claim 4 wherein:

$$0 < \alpha(k) \leq 1/k^{1+p} \text{ and}$$

$$1 > \beta(k)/\beta_0 \geq 1 - 1/k^q$$

when $k \geq 1$, wherein $\alpha(k)$ and $\beta(k)$ are functions such that for each said color S satisfying the condition (G1), $$\alpha(k)=\alpha(kS_{Bmax}(S)) \text{ and } \beta(k)=\beta(kS_{Bmax}(S))$$

where $S_{Bmax}(S)$ is colinear to S and is on the target gamut's boundary, where p and q are positive numbers which are constant with respect to k.

9. The method of claim 8 where p and q are independent of $S_{Bmax}(S)$.

10. The method of claim 4 wherein $\epsilon_M \leq 1/20$.

11. A computer-implemented method for mapping first image data into a target gamut, the first image data representing an image which comprises one or more colors S each of which satisfies a condition (G1) which is as follows:

(G1) S is outside of the target gamut but a color cS is inside the target gamut for at least one positive c, the method comprising one or more computer processors receiving at least part of the first image data from a computer storage and/or a network and executing one or more computer instructions that process the at least part of the first image data to generate second image data, wherein generating the second image data comprises, for each color S satisfying the condition (G1), performing a mapping operation by the one or more computer processors executing the one or more computer instructions, the mapping operation causing the second image data to represent a color S' to map the color S into the color S', wherein $$S'=\alpha(S)S+\beta(S)W$$

wherein:

(i) S' is in an $\epsilon_G$-neighborhood of the target gamut's boundary, i.e. a color $$(1-\epsilon_G)S'$$

is in the target gamut, and kS' is outside of the target gamut for each $k>1+\epsilon_G$, where $\epsilon_G$ is a predefined non-negative constant independent of S and not exceeding $1/10$;

(ii) W is a predefined color independent of S, where W is not zero in a linear color coordinate system, and where uW is inside the target gamut for at least one u>0;

(iii) $\alpha(S)$ and $\beta(S)$ are non-negative, and $\beta(\bullet)$ satisfies one or both of conditions (A) and (B), the conditions (A) and (B) being as follows:

(A) when k>0 and k→∞, then
$\beta(kS) \to \Theta°$,
where $\beta_o$ is a positive number independent of S;
  (B) for all pairs $(k_1, k_2)$ of positive numbers which satisfy both conditions (B1) and (B2) below, $\beta(\bullet)$ satisfies (B3) below, wherein the condition (B1) is specified for a predefined non-negative number $\epsilon_M$ independent of S and not exceeding 1/10:
  (B1) pair $(k_1, k_2)$ is $\epsilon_M$-ordered, i.e. $k_2 > k_1(1+\epsilon_M)$;
  (B2) $k_1 S$ and $k_2 S$ are outside of the target gamut;
  (B3) $\beta(k_2 S) \geq \beta(k_1 S)$, and
  $\beta(k_2 S) > \beta(k_1 S)$ for at least one pair $(k_1, k_2)$ satisfying (B1) and (B2).

12. The method of claim 11 wherein the mapping operation is also performed, by the one or more computer processors executing one or more computer instructions., for each color S which is represented by the image data but does not satisfy the condition (G1).

13. The method of claim 11 wherein the image comprises one or more colors $S_{in}$ each of which is outside of the target gamut and does not satisfy the condition (G1);
  wherein the method further comprises modifying the first image data by the one or more computer processors executing one or more computer instructions to obtain modified first image data representing modified colors such that each said color $S_{in}$ is replaced with a modified color which satisfies the condition (G1);
  wherein the mapping operation is performed on the modified first image data for at least one modified color.

14. The method of claim 11 where W represents a white color.

15. The method of claim 11 wherein $\beta(\bullet)$ satisfies the condition (A).

16. The method of claim 11 wherein $\beta(\bullet)$ satisfies the condition (B).

17. The method of claim 11 wherein $\epsilon_G = 0$.

18. The method of claim 11 wherein $\epsilon_M \leq 1/20$.

19. A computer-implemented method for mapping first image data representing an image into a target gamut, the image data representing an image which comprises one or more colors S each of which is specified by a color vector and satisfies a condition (G1) which is as follows:
  (G1) S is outside of the target gamut but a color cS is inside the target gamut for at least one positive c,
  the method comprising one or more computer processors receiving at least part of the first image data from a computer storage and/or a network and executing one or more computer instructions that process the at least part of the first image data to generate second image data, wherein generating the second image data comprises:
  for each color vector S specifying a color satisfying the condition (G1), performing a mapping operation by the one or more computer processors executing the one or more computer instructions, the mapping operation causing the second image data to represent a color vector S' to map S into S', wherein the vector S' forms an angle C' with a predefined non-zero color vector W in an $\epsilon$-orthonormal linear color coordinate system where $\epsilon$ is at least 70%, the color vector W being independent of S and such that uW is inside the target gamut for at least one u>0, wherein
  C'=Φ(S)
wherein:
  (i) S' is in an $\epsilon_G$-neighborhood of the target gamut, i.e. a color $(1-\epsilon_G)S'$ is in the target gamut, where $\epsilon_G$ is a predefined non-negative constant independent of S and not exceeding 1/10;
  (ii) Φ(•) is a predefined function satisfying one or both of conditions (A) and (B), the conditions (A) and (B) being as follows:
  (A) when k>0 and k→∞, then
  Φ(kS)→0;
  (B) for all pairs $(k_1, k_2)$ of positive numbers which satisfy both conditions (B1) and (B2) below, Φ satisfies (B3) below, wherein the condition (B1) is specified for a predefined non-negative number $\epsilon_M$ independent of S and not exceeding 1/10:
  (B1) pair $(k_1, k_2)$ is $\epsilon_M$-ordered, i.e. $k_2 > k_1(1+\epsilon_M)$;
  (B2) $k_1 S$ and $k_2 S$ are outside of the target gamut;
  (B3) $\Phi(k_2 S) \leq \Phi(k_1 S)$, and
  $\Phi(k_2 S) < \Phi(k_1 S)$ for at least one pair $(k_1, k_2)$ satisfying (B1) and (B2).

20. The method of claim 19 wherein the mapping operation is also performed, by the one or more computer processors executing one or more computer instructions, for each color vector S specifying a color which is represented by the image data but does not satisfy the condition (G1).

21. The method of claim 19 wherein the image comprises one or more colors $S_{in}$ each of which is outside of the target gamut and does not satisfy the condition (G1);
  wherein the method further comprises modifying the first image data by the one or more computer processors executing one or more computer instructions to obtain modified first image data representing modified colors such that each said color $S_{in}$ is replaced with a modified color which satisfies the condition (G1);
  wherein the mapping operation is performed on the modified first image data for at least one modified color.

22. The method of claim 19 wherein S' is in an $\epsilon_G$-neighborhood of the target gamut's boundary, i.e. kS' is outside of the target gamut for each $k > 1 + \epsilon_G$.

23. The method of claim 19 where W represents a white color.

24. The method of claim 22 wherein Φ(•) satisfies the condition (A).

25. The method of claim 22 wherein Φ(•) satisfy the condition (B).

26. The method of claim 18 wherein:

$0 < \Phi(S) \leq C/k^p$ where C is the angle between S and W, and k is such that $S = k S_{Bmax}(S)$ where $S_{Bmax}(S)$ is colinear to S and is on the boundary of the target gamut, where p is a positive number which is constant with respect to k.

27. The method of claim 26 wherein p is independent of $S_{Bmax}(S)$.

28. The method of claim 22 wherein $\epsilon_M \leq 1/20$.

29. The method of claim 22 wherein $\epsilon$ is at least 90%.

30. A computer system to perform the method of claim 1, the computer system comprising the one or more computer processors and also comprising one or more computer readable media storing each said computer instruction for execution by the one or more computer processors.

31. A set of one or more computer readable media comprising one or more computer instructions operable to cause a computer system to perform the method of claim 1, the computer system comprising said one or more computer processors.

32. A network transmission method comprising transmitting one or more computer instructions over a network, wherein the one or more computer instructions are operable to cause a computer system to perform the method of claim 1, the computer system comprising said one or more computer processors.

33. A computer system to perform the method of claim 11, the computer system comprising the one or more computer processors and also comprising one or more computer readable media storing each said computer instruction for execution by the one or more computer processors.

34. A set of one or more computer readable media comprising one or more computer instructions operable to cause a computer system to perform the method of claim 11, the computer system comprising said one or more computer processors.

35. A network transmission method comprising transmitting one or more computer instructions over a network, wherein the one or more computer instructions are operable to cause a computer system to perform the method of claim 11, the commuter system comprising said one or more computer processors.

36. A computer system to perform the method of claim 19, the computer system comprising the one or more computer processors and also comprising one or more computer readable media storing each said computer instruction for execution by the one or more computer processors.

37. A set of one or more computer readable media comprising one or more computer instructions operable to cause a computer system to perform the method of claim 19, the computer system comprising said one or more computer processors.

38. A network transmission method comprising transmitting one or more computer instructions over a network, wherein the one or more computer instructions are operable to cause a computer system to perform the method of claim 19, the computer system comprising said one or more computer processors.

39. The method of claim 1 further comprising providing the second image data to a display device for displaying, on the display device, an image represented by the second image data.

40. The method of claim 1 further comprising displaying an image represented by the second image data on a display device.

41. The method of claim 39 wherein the display device is a computer monitor and/or a television monitor.

42. The method of claim 11 further comprising providing the second image data to a display device for displaying, on the display device, an image represented by the second image data.

43. The method of claim 11 further comprising displaying an image represented by the second image data on a display device.

44. The method of claim 43 wherein the display device is a computer monitor and/or a television monitor.

45. The method of claim 19 further comprising providing the second image data to a display device for displaying, on the display device, an image represented by the second image data.

46. The method of claim 45 further comprising the display device displaying the image represented by the second image data.

47. The method of claim 45 wherein the display device is a computer monitor and/or a television monitor.

* * * * *